United States Patent [19]

Lippel et al.

[11] 4,178,489

[45] Dec. 11, 1979

[54] SUSPENSION SYSTEM FOR DISC RECORDING CUTTER HEAD

[75] Inventors: Arthur T. Lippel; John R. Valvo, both of Los Angeles; Gerald B. Smith, Huntington Beach, all of Calif.

[73] Assignee: Lippel Cybersonics, Inc., Sun Valley, Calif.

[21] Appl. No.: 901,574

[22] Filed: May 1, 1978

[51] Int. Cl.² .............................................. G11B 3/14
[52] U.S. Cl. ..................... 179/100.4 C; 179/100.4 D; 274/9 D; 274/23 R
[58] Field of Search ............... 179/100.4 C, 100.4 ST, 179/100.4 D; 274/9 D, 23 R, 46 R

[56] References Cited

U.S. PATENT DOCUMENTS

| 2,112,699 | 3/1938 | Kleber | 179/100.4 C |
| 2,963,556 | 12/1960 | Redlich | 179/100.4 C |

*Primary Examiner*—Bernard Konick
*Assistant Examiner*—Donald McElheny, Jr.
*Attorney, Agent, or Firm*—Allan M. Shapiro

[57] ABSTRACT

The disc recording cutter head is carried on the inner end of an arm which is pivoted intermediate its ends. A counterbalance weight on the outer end of the arm exactly counterbalances the cutter head. A direct current torque motor mounted on the pivot axis applies cutting force to the cutting stylus. Additional features optionally include damping of arm motion by arm position feedback to the torque motor and control of the cutting force as a function of stereo program material.

24 Claims, 2 Drawing Figures

SUSPENSION SYSTEM FOR DISC RECORDING CUTTER HEAD

BACKGROUND OF THE INVENTION

1. Field of the Invention

This invention is directed to a suspension system for a disc recording cutter head where a torque motor on the pivot axis of the arm is controlled to provide the cutting force.

2. Description of the Prior Art

In cutting and playing back phonograph records, a turntable carries and rotates the record. An arm swings over the record surface and carries an electromechanical transducer with a stylus on the outer end thereof. In the case of recording, the transducer receives electronic signals representing program material and moves the stylus to cut the record. In playback, the stylus follows the analog signals represented in the record groove, and the transducer provides a corresponding electrical signal. In either case, the stylus force on the disc is important. In the first case, the proper stylus force is necessary for the proper depth of cutting. In the second case, stylus force must be minimized for minimum disc wear, but must be sufficient to provide proper tracking.

A number of different arrangements have been previously applied to control the stylus force. Usually, the arm is pivoted, and past electrical attempts at controlling the stylus force have been directed to employing a solenoid to provide counterbalancing force with incremental control of the counterbalancing force to control the cutting force. However, conventional cutter heads are quite heavy so that attempts at incremental force changes beyond that required for balancing result in equipment which has very poor control characteristics, and such have not been fully successful in producing proper control of the cutting stylus in record cutting equipment.

SUMMARY OF THE INVENTION

In order to aid in the understanding of this invention, it can be stated in essentially summary form that it is directed to a suspension system for disc record cutter head where the cutter head is mounted adjacent one end of a pivoted arm and the counterbalance weight is mounted on the other end of the arm opposite the pivot. A torque motor is mounted directly at the pivot axis to apply the cutting force for the cutting stylus on the cutter head.

It is thus an object of this invention to provide a suspension system for disc recording cutter heads wherein the cutter head is mounted on a pivoted tone arm with appropriate counterbalancing, and a torque motor mounted on the pivot axis applies torque to the cutter arm for providing stylus cutting force. It is another object to provide such a suspension system with means for controlling current to the torque motor so that the cutting force is controlled. It is a further object to provide such a suspension system wherein the counterbalance fully counterbalances the weight of the structure so that the cutting force on the stylus is completely provided by the torque motor on the pivot axis so that the cutting force is completely electrically controlled. It is a further object to provide a tone arm position sensor and means to feed back the position sensing to the torque motor for damping tone arm excursions. It is still another object to provide an interconnection between the type of program material and the torque motor so that the torque motor provides an appropriate cutting force on the cutting stylus in accordance with the character of the program material.

The features of the present invention which are believed to be novel are set forth with particularity in the appended claims. The present invention, both as to its organization and manner of operation, together with further objects and advantages thereof, may be understood best by reference to the following description taken in conjunction with the accompanying drawings.

DESCRIPTION OF THE PREFERRED EMBODIMENT

Figure 1:
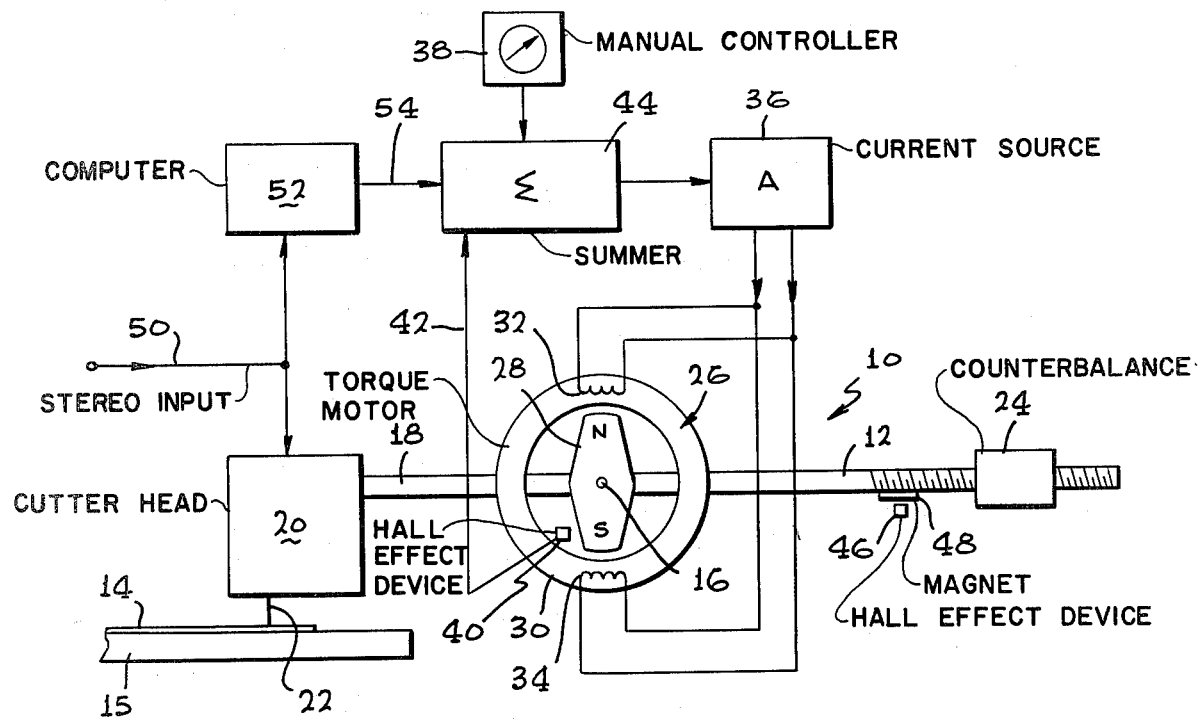
FIG. 1 is a side elevational view of the suspension system for disc recording cutter head in accordance with this invention, showing the suspension system and associated equipment partially schematically and with parts broken away.
Figure 2:
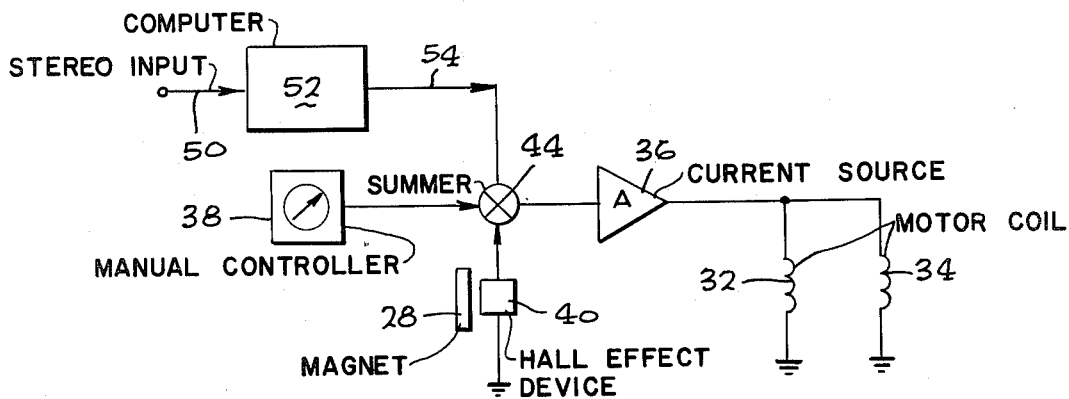
FIG. 2 is a schematic electrical diagram of the circuitry which controls the torque motor of the suspension system.

FIG. 1 shows the suspension system for disc recording cutter head generally at 10. The system 10 is applied to the arm 12 of equipment for cutting a lacquer original record disc 14. Disc 14 is supported on a turntable 15, and it is rotated about a vertical axis which extends in an upright direction in the drawing of FIG. 1 and lies parallel to the plane of the paper. Lacquer disc 14 is suitably rotated so that a spiral recording groove can be cut therein.

Arm 12 is pivoted on the pivot axis 16 so that the inner end 18 of arm 12 can swing up and down toward and away from lacquer disc 14. Cutter head 20 is mounted on the inner end 18 of arm 12. Cutter head 20 has electromechanical transducers therein for driving stylus 22 in cutting relationship with the top surface of lacquer disc 14. Arm 12 is also pivoted on an axis parallel to the axis of rotation of lacquer disc 14, or is provided with equivalent movement, so that stylus 12 can cut a spiral groove in lacquer disc 14 as the disc rotates. Most cutter heads 12 weigh about one pound, and some weigh considerably more. The transducers in the cutter head 20 move the stylus with respect to the cutter head to provide modulation to the groove that is cut. The nominal cut width of the stylus into the lacquer in conventional record cutting is 0.002 inch. The cut groove has a 90 degree included angle at the bottom, with each groove wall being 45 degrees with respect to the vertical. With this geometry, the ratio of width-to-depth of the groove is 2 to 1. In recording of stereo information, the two groove walls carry the modulation corresponding to the two stereo channels. The geometry is arranged so that, when a signal appears in both stereo channels, the stylus is moved laterally so that there is no change in the cutting depth. Such is the conventional stereo signal. It can be seen that the proper cutting force must be applied to stylus 22 to achieve the desired cutting of the stylus into the lacquer on disc 14.

Pivot axis 16 has a very low friction bearing so that pivot friction does not contribute to the positioning of arm 14 or affect the forces applied thereto. Counterbalance 24 is attached to the outer end of arm 12 and is adjusted therealong until it exactly counterbalances the arm and cutter head 20 so that there is no upward or downward force at stylus 22.

Stylus cutting force is produced by torque motor 26 which is attached between a support and arm 12. Permanent magnet 28 is attached to arm 12 at the pivot axis 16, and it rotates on the pivot axis 16. Permanent magnet 28 has the indicated north and south poles, shown oriented upward and downward in FIG. 1. The stator includes a pole ring 30 which surrounds permanent magnet 28 and is spaced substantially equidistant from the poles of the permanent magnet 28. Pole ring 30 is secured to the surrounding structure and the stator also includes coils 32 and 34 on the pole ring. Coils 32 and 34 are arranged for DC energization and the polarity is arranged for producing additive magnetic fields in the stator. Such a structure produces torque, and torque in such a DC-energized permanent magnet torque motor through its useful range is proportional to the energization current. Voltage controlled current source 36 is connected to supply current to the torque motor stator coils 32 and 34.

For the preferred embodiment, a manual controller 38 is connected by way of summer 44 to the input of current source 36 to control the voltage applied thereto to thus control the current through the stator coils. In this way, the cutting force can be manually adjusted and, in fact, the cutting force can be read by an ammeter, suitably scaled, in the current supply lines to the stator coils.

With this invention, the cutting force on stylus 22 is independent of cutter head size or type. Furthermore, it is independent of the movement of the stylus with respect to the cutter head. Additionally, warp or movement of record 14 does not affect the cutting depth. The magnitude of the force is solely determined by the DC current in the stator coils, and this is manually controlled by controller 38. Since the torque motor is at pivot point 16, the torque can be directly applied, no extraneous factors need be compensated, and linearity of the system is assured.

In another preferred embodiment, Hall effect device 40 is mounted on the base and is positioned adjacent one of the poles of rotor magnet 28. It senses the proximity of the pole of the rotor magnet 28 and thus senses the relative position of arm 12 and stylus 22 with respect to the base. This position sensing is fed back through line 42 to summer 44 where it is added, with appropriate scaling factor, to the signal from manual controller 38. The Hall effect device 40 serves as a damper to overcome vibration and oscillation.

The Hall effect device 40 is in the preferred location because it is adjacent the existing rotor magnet 28. If another location is desirable, the Hall effect device alternatively may be located at 46 adjacent the outer end of arm 12. In such a case the permanent magnet 48 is secured to the outer end of the arm to cooperate with the Hall effect device 46. Being farther from the pivot axis 16, Hall effect device 46 will be more sensitive to increments of angular rotation about the pivot axis 16.

As previously described, the polarity of the electromechanical transducers which drive stylus 22 in accordance with the incoming stereo music information is arranged so that, when the left and right channels have the same signal, then the net result is lateral movement of stylus 22 in the direction of the top plane of lacquer disc 14. The stereo music program material is provided to line 50 from the conventional audio processing equipment. While one line 50 is represented, this line actually represents a suitable number of wires to provide the needed stereo connections. It can be seen that, when the left and right stereo channels have opposite signals, then the stylus operates vertically, i.e., perpendicular to the top plane of lacquer disc 14. In view of the fact that the stylus 22 is only cutting about 0.001 inch deep in normal operation, then a strong left-minus-right signal gives a strong vertical motion to stylus 22 with the result that it may cut a very much shallower record groove. Such a shallower groove then contains shorter walls and less capacity for causing stylus excursion on playback. In effect, with a shallow stylus cut, about half the sound can be lost. Furthermore, extreme conditions may cause the cut groove to be so shallow that, on playback, the stylus will leave the groove and skitter across the record.

To overcome this problem, the music material is also fed by line 50 to computer 52. Computer 52 is a specialized one which evaluates the two stereo signal channels. When the program material is principally the conventionally left-plus-right stereo information which causes lateral stylus movement, the output 54 from computer 52 to summer 44 is virtually zero. However, when analysis of the stereo music channel shows unusual left-minus-right channel signals, the output 54 from computer 52 signals for more current out of voltage controlled current source 36 to cause a greater cutting force on stylus 22. Thus, during those passages, the average cutting force and the average cutting depth is greater, to produce a cut groove which is sufficiently deep so that, even with substantial left-minus-right channel stereo music program material, stylus 22 has an adequate cutting depth to produce full sound.

Both the arm position detector and the program material analyzer are additional features to the basic structures wherein the cutting force can be accurately, manually selected, with the cutting force being applied by a torque motor on the pivot axis so that the cutting force is constant and independent of conditions at the stylus. The additional features of the position detector and the program material analyzer, each individually adding information for the control of cutting head force, provide additional preferred embodiments.

This invention having been described in its preferred embodiment and several additional preferred embodiments having also been disclosed, it is clear that this invention is susceptible to numerous modifications and improvements within the ability of those skilled in the art and without the exercise of the inventive faculty. Accordingly, the scope of this invention is defined by the scope of the following claims.

What is claimed is:

1. A suspension system for a disc recording cutter head, said suspension system comprising:
   an arm, pivot means for supporting said arm on a generally horizontal pivot axis so that said arm swings in a generally upright plane, means on the inner end of said arm for attachment of a cutter head for carrying a record cutting stylus, and a counterbalance on the outer end of said arm, said counterbalance being adjusted to balance said arm and attachments thereto about said pivot axis of said arm;
   a DC torque motor mounted on said arm on said pivot axis for rotation of said arm around its pivot axis, said torque motor including at least one energizing coil for causing said torque motor to produce torque in a direction to urge a stylus toward a recording disc; and means for energizing said torque motor for producing torque in said torque motor and producing recording disc cutting force at the stylus.

2. The system of claim 1 wherein said torque motor includes a permanent magnet.

3. The system of claim 2 wherein said energizing coil comprises a direct current coil so that the torque produced by the torque motor is substantially proportional to the current in said DC coil.

4. The system of claim 3 wherein said permanent magnet is a rotor and said coil is a portion of the torque motor stator.

5. The system of claim 4 wherein said stator is a ring stator surrounding said permanent magnet rotor and said coil energizes said ring stator.

6. The system of claim 1 wherein said means for energizing said torque motor is a constant current source.

7. The system of claim 6 wherein said constant current source is adjustable to control stylus cutting force.

8. The system of claim 7 wherein said means for energizing said torque motor is a voltage controlled constant current source.

9. The system of claim 8 wherein a manual controller is connected to said voltage controlled current source to adjust the voltage applied to said voltage controlled current source to establish the current to said torque motor.

10. The system of claim 9 wherein said torque motor includes a permanent magnet.

11. The system of claim 10 wherein said energizing coil comprises a direct current coil so that the torque produced by the torque motor is substantially proportional to the current in said DC coil.

12. The system of claim 11 wherein said permanent magnet is a rotor and said coil is a portion of the torque motor stator.

13. The system of claim 12 wherein said stator is a ring stator surrounding said permanent magnet rotor and said coil engages said ring stator.

14. The system of claim 1 wherein a program material analyzer is connected to receive right and left channel stereo information which also can be fed to a cutter head, said program material analyzer being connected to control energization of said torque motor so that said torque motor produces a first value of torque when the stereo information causes the cutter head to produce a lateral component and an increased value of torque when the stereo information causes the cutter head to produce a substantial vertical component.

15. The system of claim 14 further including a manual controller connected to adjust the torque for a minimum value of torque when the program material analyzer causes the cutter head to produce only a lateral component.

16. The system of claim 1 wherein a position sensor is connected to detect the position of said arm, said position sensor being connected to control said means for energizing said torque motor so that position feedback from said arm to said torque motor is provided.

17. The system of claim 16 wherein said sensor is a Hall effect device for measuring the proximity of a magnetic field source.

18. The system of claim 17 wherein said torque motor includes a permanent magnet stator fastened to said arm and said sensor is positioned adjacent said stator.

19. A suspension system for disc recording cutter head comprising:
an arm having an inner end and an outer end and having a pivot axis therebetween for pivoting said arm to swing in a generally upright plane, means for attaching a cutting stylus carrying cutter head on the inner end of said arm and for feeding two channels of stereo program material to the cutter head for controlling its stylus, a counterbalance on the outer end of said arm on the opposite side of said pivot to counterbalance said arm about its pivot axis;
a torque motor mounted on said arm on its pivot axis for torquing said arm in a direction to apply cutting force from the stylus onto a recording disc;
means for energizing said torque motor; and
a program material analyzer connected to received program material fed to the cutter head and to compare two channels of stereo program material, said program material analyzer being connected to control said torque motor energizing means so that said torque motor is energized to produce a first torque level when the stereo program material causes the cutter head to produce a lateral component and to produce a larger torque level when the stereo program material causes the cutter head to produce a substantial vertical component.

20. The system of claim 19 wherein manual adjustment means is connected to manually control said first level.

21. The system of claim 20 wherein said torque motor includes a permanent magnet.

22. The system of claim 21 wherein said torque motor also comprises a direct current coil so that the torque produced by the torque motor is substantially proportional to the current in said DC coil.

23. The system of claim 22 wherein said permanent magnet is a rotor and said coil is a portion of a torque motor stator.

24. The system of claim 23 wherein said stator is a ring stator surrounding said permanent magnet rotor and said coil energizes said ring stator.

* * * * *